May 22, 1962
R. E. JONES ET AL
3,035,481
CUVETTE OXIMETER
Filed Aug. 11, 1958
3 Sheets-Sheet 1
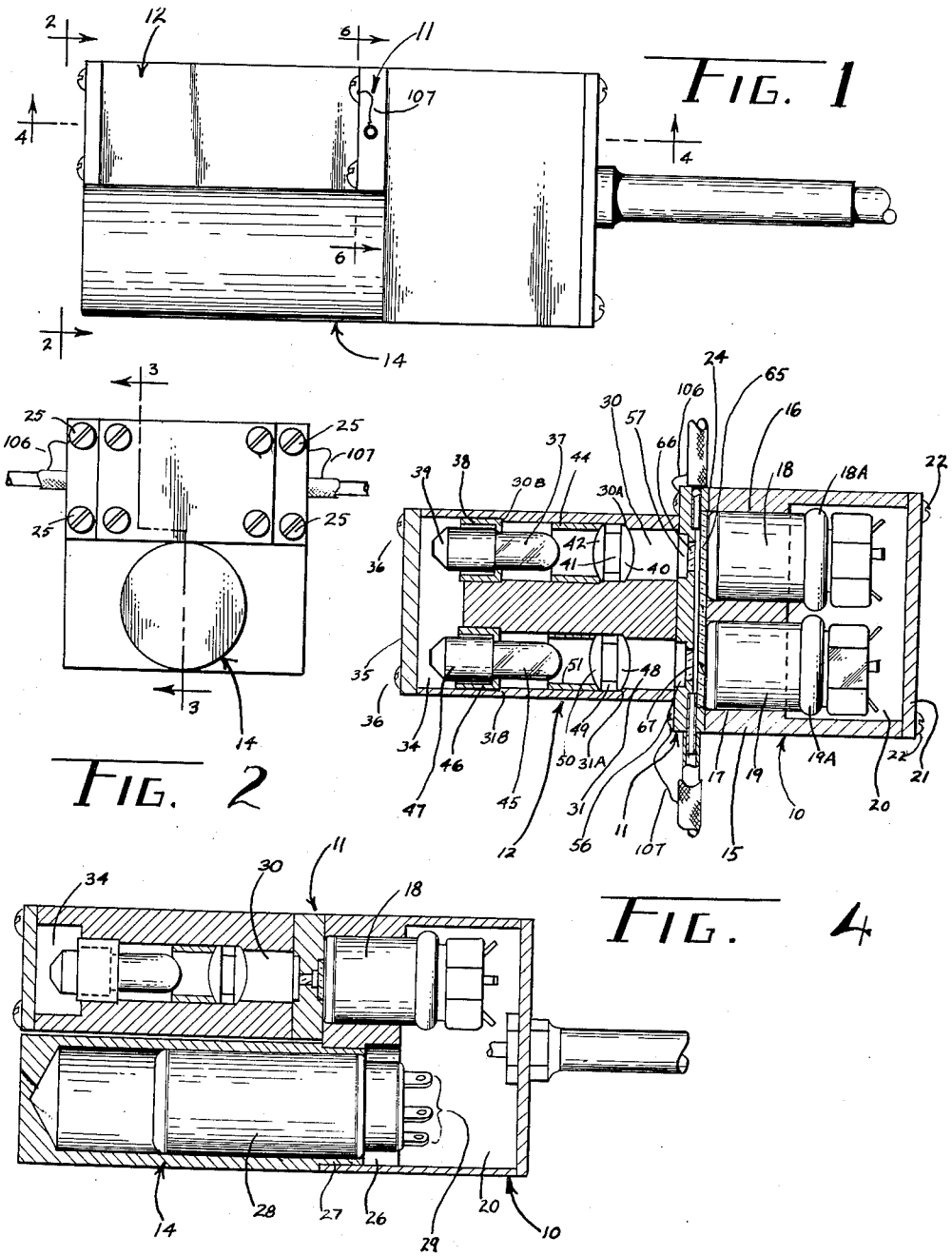
INVENTOR
RICHARD E. JONES
JAMES ISAACSON
BY
Ralph L. Dugger
ATTORNEY

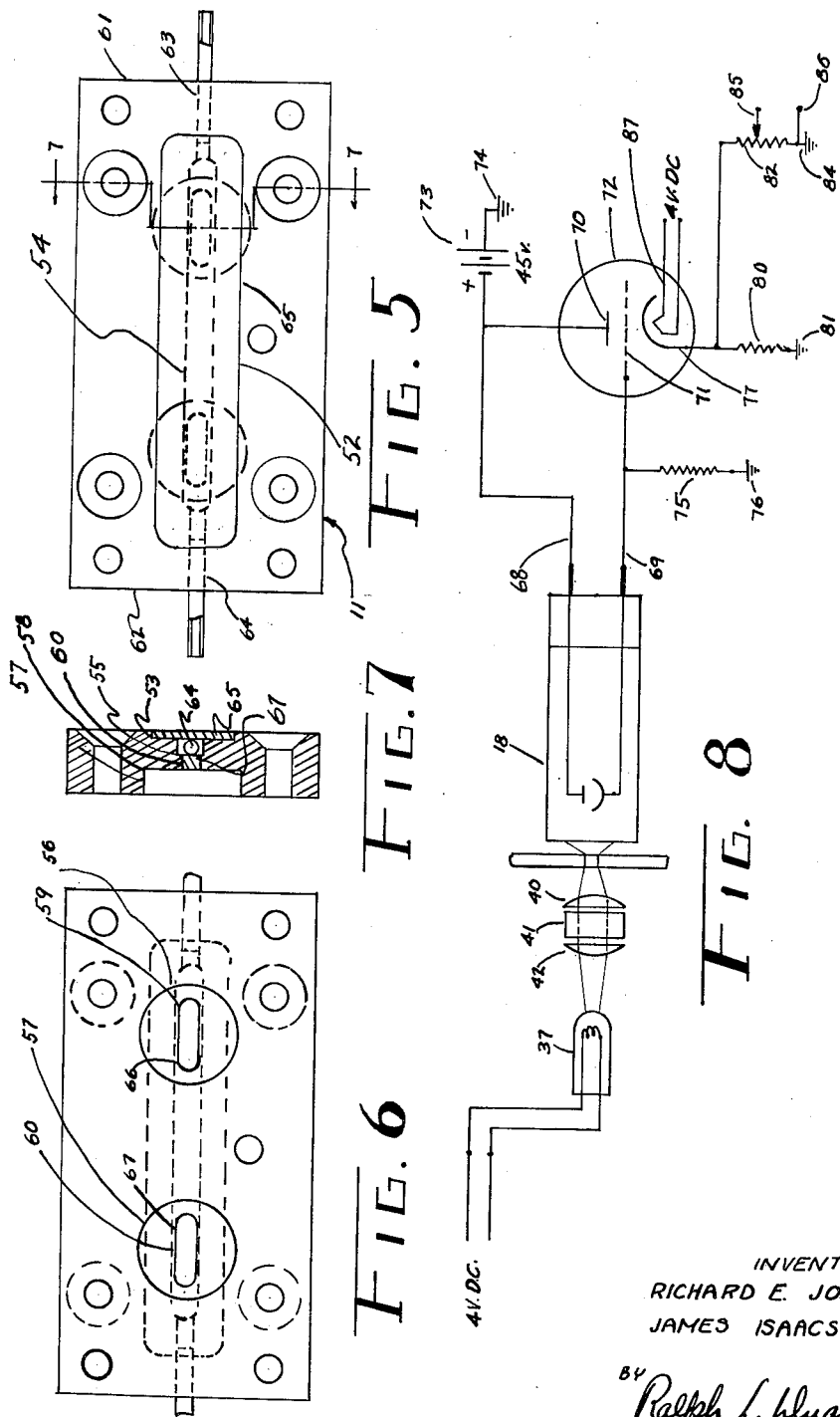

May 22, 1962

R. E. JONES ET AL 3,035,481

CUVETTE OXIMETER

Filed Aug. 11, 1958

INVENTOR
RICHARD E. JONES
JAMES ISAACSON

BY Ralph L. Wugger
ATTORNEY

United States Patent Office 3,035,481
Patented May 22, 1962

3,035,481
CUVETTE OXIMETER
Richard E. Jones and James Isaacson, Rochester, Minn., assignors, by mesne assignments, to Research Corporation, New York, N.Y., a corporation of New York
Filed Aug. 11, 1958, Ser. No. 754,216
3 Claims. (Cl. 88—14)

This invention relates to an improved cuvette apparatus which may be used for determining the density of blood and which may also be used for determining the percentage oxygen saturation of the hemoglobin of the blood. Apparatus of this type has heretofore been provided, as in Patent 2,706,927. Such apparatus has conducted the blood sample through a transparent plastic tube, and by trans-illuminating such a tube with light of appropriate wave lengths, it has been possible to obtain electrical signals from barrier layer photo cells, in proportion to the amount of light that was transmitted through the blood instead of being absorbed by it.

It is an object of the present invention to provide a cuvette apparatus of this general type in which an electrical signal of greater strength is obtainable. It is a further object of the invention to provide an improved cuvette oximeter wherein the light used for trans-illuminating the sample is not permitted to bypass the sample. It is another object of the invention to provide an improved cuvette oximeter utilizing a photo cell or photo cells as the light responsive device.

Other and further objects are those inherent in the invention herein illustrated and described in claims, and will be apparent as the description proceeds.

Through the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in reference to the drawings wherein FIGURE 1 is a side elevational view of a representative form of the invention.

FIGURE 2 is an end elevational view of the apparatus shown in FIGURE 1 taken in the direction of arrows 2—2, in FIGURE 1.

FIGURE 3 is a vertical sectional view taken along the line and in the direction of arrows 3—3 of FIGURE 2.

FIGURE 4 is a horizontal sectional view taken along the lines and in the direction of arrows 4—4 of FIGURE 1.

FIGURE 5 is a view from the photo cell side of the cuvette portion of the apparatus through which the blood sample is carried.

FIGURE 6 is a vertical elevational view of the same element as shown in FIGURE 5, except from the lamp side.

FIGURE 7 is a sectional view taken along the line and in the direction of arrows 7—7 of FIGURE 5.

FIGURE 8 is a wiring diagram of the apparatus when used as a densitometer.

Figure 9:
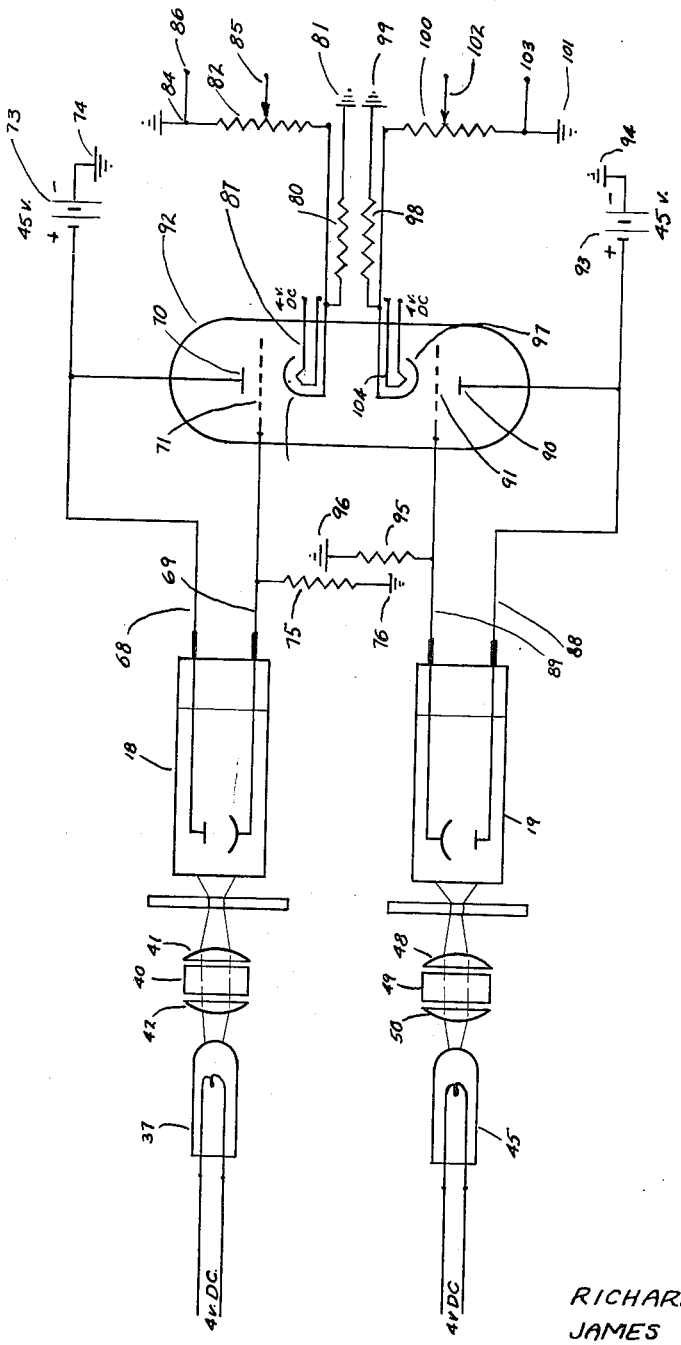
FIGURE 9 is a wiring diagram of the apparatus as it is when used as a cuvette oximeter for the purpose of providing the essential signals for determining the percentage oxygen saturation of the hemoglobin of the blood.

Referring to the drawings the apparatus consists of a metal case generally designated 10 which is adapted to contain the photo electric cells, a lumen body generally designated 11, a metal case generally designated 12 adapted to contain the lamps that provide the illumination in the apparatus, and the pertinent lenses and light filters, and a case generally designated 14 for containing the amplifier used in the apparatus. The cases 10 and 12 are held together by screws which therefore electrically connect them, and case 14 is press fitted into case 10.

The case 10, containing the photo cells, is of generally rectangular configuration and has a solid portion 15 which is bored out to provide two cylindrical recesses 16 and 17 for containing the cylindrical photo electric tubes 18 and 19 in a position such that the bases of the tubes at 18a and 19a are located in an enlarged recess 20 in the case 10. Recess 20 is adapted to be closed by a cover plate 21 held in place by screws 22. The recesses 16 and 17 containing the cylindrical glass envelopes of the photo cells 18 and 19 respectively, extend all the way through to the end surface 24 of the case 10 and this end surface 24 is adapted to be closed by the lumen plate 11. This lumen plate is held in place by screws 25—25. In the lower part of the case 10 there is centrally located another cylindrical recess 26, into which there is pressed the reduced end portion 27 of the amplifier housing 14, which contains a double amplifier tube of the voltage amplification type such as 12AU7A. The base of this amplifier tube extends into the recess 20 of case 10 where appropriate connections may be made to the tube terminals 29.

The case 12 for containing the light source lenses, and light filters, is positioned above the amplifier tube case 14 and includes a body provided with two cylindrical bores 30 and 31 having a minimum diameter in that portion facing the lumen plate 11. The diameter of the bore 31 is increased at 31a and the diameter of the bore 30 is increased at 30a. This bore then extends to the point 31B for bore 31 and point 30B for the bore 30 in which the diameter is again increased. In the left end of the case 12 as shown in FIGURE 4, there is provided a wide recess at 34 which overlaps bores 30 and 31 and is adapted to be covered by a plate 35 held in place by screws 36—36. These screws are adapted to extend entirely through the body of the case 12 and into the case 10 for holding the entire assembly together. Within each of the bores 30 and 31 there is provided a lamp and a lens and a light filter assembly, which are identical except for the wave length of the light passed by the filter. Thus in the bore 30 there is provided a lamp 37 mounted in a cushioning base 38 having its socket end 39 contained within the space 34. Within the bore 30 and against the shoulder 30a there is pressed a lens 40 and against the lens there is provided a filter 41 that is held in place by another lens 42, the entire lens and filter assembly being held in place by the sleeve 44. The filter, when used for determining the infra red absorption of blood, is an interference filter capable of passing a wave length of approximately 7900 Angstrom units, the range being approximately 7200 to 9000 Angstrom units.

In the bore 31 there is similarly located a lamp 45 supported in the cushioning base 46 with its socket end 47 located in the space 34. In this bore are also located the lens 48, filter 49, and lens 50 held in place by the sleeve 51. Where the filter 49 is used for determining the red light absorption of the hemoglobin of the blood, the filter 49 passes light of approximately 6500 Angstrom units. This filter should be capable of passing light in the approximate range of 6000 to 9000 Angstrom units.

The lumen plate 11 consists of an opaque substance preferably opaque black Lucite having parallel sides. On one face of this plate, as shown in FIGURE 5 there is milled a slot 52 having a depth to the level 53 as shown in FIGURE 7, and along the center of this slot there is milled another slot 54 which is slightly shorter than the slot 52 and has a depth to the line 55. On the opposite side of the lumen plate there are bored the two holes 56 and 57 which are to a depth to the line 58 in FIGURE 7, and across the base of each of these holes there is milled a short slot as at 59 for the hole 56 and 60 for the hole 57, slots 59 and 60 being of sufficient depth so as to intersect the base of the slot 54 at the line 55, as shown in FIGURE 7 thus forming apertures through the lumen plate.

Into each of the little slots 59 and 60 is cemented a filling of clear material 66 and 67 such as clear Lucite, which completely fills the slot. Into the slot 52 there is likewise cemented a piece of clear material 65 such as clear Lucite which fills the slot 52 to the level of line 53 in FIGURE 7.

Into each end surface as at 61 and 62 of the lumen plate 11 there is drilled a hole as at 63 for the surface 61 and 64 for the surface 62. These holes are located so as to intersect the ends of the slot 54. Short lengths of metallic tubing are inserted in these holes, and onto these short lengths of metallic tubing there are then connected pieces of plastic tubing, forming the inlet and outlet of the blood sample supply. Each of these pieces of plastic tubing is covered by a woven metal grounding shield and these shields are electrically connected to the main body of the cuvette by wires 106 and 107 so that the shields are connected together and to the metal parts of the cuvette.

When the apparatus is assembled, the end surfaces of the photo cells 18 and 19, being at the end surface 24 of the case 10, will also be substantially in abutment with the outer surface of the clear plastic plate 65. A very slight clearance space is left between the ends of the photo cell tubes and the outer surface of the plate 65 and during assembly a clear jelly-like material is placed in the outer surface of the photo electric cell tubes so as to fill this clearance space and thus enhance the transmission of light passing through the clear plate 65 and into the photo cells 18 and 19 respectively.

Each of the photo cells 18 and 19 is of the type having the photosensitive surface on the flat end surface of the photo cell envelope which in this instance is placed against the surface 65 of the clear plastic window. These tubes may be of the type Dumont #K-1573. When the light container 12 is assembled as aforesaid the ends of the bores 30 and 31 will be axially aligned with the bores 56 and 57 of the lumen plate 11 and consequently the illumination from the lamps 37 and 45, after being filtered to a precise wave length is then focused by the lens system 40—42 and 48—50 respectively and will be concentrated on the openings 56 and 57 thereby to be transmitted through the clear glass windows 66 and 67. Since the entire lumen plate 11 is opaque except for the windows 66 and 67 and 65 all light that passes through the windows 66 and 67 will be passed through the blood sample itself contained in slot 54 and will not be bypassed through a transparent wall of a container, such as a plastic tube, as in prior devices. In this way a stronger light beam of constant predictable value is obtained for each wave length of light trans-illuminated through the columnar sample of blood flowing in the lumen space 54.

Referring to the line diagram FIGURE 8 the output from the photo electric tube is conducted by the output lead wires 68 and 69 to respectively the plate 70 and grid 71 of the tube 72. The plate is connected to the positive pole of battery 73 which is grounded at 74. The grid is connected to the resistor 75 to ground 76. The cathode 77 of the tube is connected to the resistor 80 to ground at 81 and is connected via resistor 82 of the potentiometer type to ground 84. The output signal is provided at the variable tap 85 of the potentiometer connected resistor and ground terminal 86. A conventional heating filament is provided at 87.

When the apparatus is used for determining the percentage oxygen saturation of the hemoglobin of the blood there are provided two light sources, two lens systems, a filter for providing infrared light in one system, a filter for providing red light in the other light system and two photo cells with the output of each photo cell being amplified. For convenience the apparatus is usually constructed with one amplifier of the "double" type. Only one half of the amplifier tube is used when the apparatus is used as a densitometer but both halves are used when the apparatus is used for determining the percentage oxygen saturation of the hemoglobin of the blood. FIGURE 9 illustrates the wiring for the latter condition (i.e. determining percentage oxygen saturation) and shows the two lamps 37 and 45. The light from lamp 37 is conducted through the lens and light filter system 40—42 and the light from lamp 45 is conducted through the lens filter system 48—50.

In FIGURE 9 the output from photo electric tube 18 is connected in precisely the same manner as shown in FIGURE 8 with the same numbers describing the elements. The output from photo electric tube 19 is similarly connected. Output lead wires 88 and 89 leave the tube and go respectively to the plate 90 and the grid 91 of the tube 92 (92 labels the amplifier tube when both sides are in use). The plate is connected to the positive pole of battery 93 which is grounded at 94 and the grid is connected to the resistor 95 to ground 96. The cathode 97 of the tube is connected to the resistor 98 to ground at 99 and is connected via the potentiometer-resistor 100 to ground 101. The output signal is provided at the variable tap 102 of the potentiometer-connected resistor and ground terminal 103. A conventional heating filament is provided at 104. For determining the percentage oxygen saturation of the blood there are thus provided two separate outputs which are functions of the infra-red and red light absorption characteristics of the hemoglobin of the blood.

As many apparently widely different embodiments of this invention may be made without departing from the spirit and scope thereof, it is to be understood that we do not limit ourselves to the specific embodiments herein.

What we claim is:

1. An apparatus for transilluminating fluid materials comprised of an opaque conduit for retaining the fluid material in contact therewith, said conduit having light inlet and light outlet windows disposed on opposite sides of said conduit and arranged on a common axis transversely of the conduit, the light outlet window having a planar face, said light inlet and light outlet windows being capable of transmitting light therethrough, a light source and a lens for focusing light on the light inlet window, and a photoelectric tube having a planar light receiving opening positioned with said planar opening against the exterior surface of the light outlet window and a photo tube circuit connected to said tube, said apparatus being further characterized in that the light inlet window is of less area than the aperture which carries the liquid to insure that light passed by the said window will form a beam completely projected through the liquid, and the light outlet window is of larger area than said conduit to permit transmission therethrough of light dispersed by liquid in said conduit.

2. A photo responsive device for transilluminating fluid comprising an opaque conduit having an elongated aperture therethrough, first and second light inlet windows spaced from each other along the length of said conduit and on the same side of said conduit, a light outlet window on the opposite side of said conduit, said light outlet window being of sufficient dimensions so as to permit light transmitted through either of said light inlet windows to pass outwardly through said light outlet window, housing means enclosing said windowed portion of the conduit, said housing means including separate first and second light housing cavities so positioned as to be axially aligned with the axis of the said first and second light inlet windows respectively, a light source and light focusing means in each of said cavities positioned so as to project a beam of light along the cavity and against the light inlet window aligned with said cavity, a plurality of photo cells, third and fourth cavities in said housing means located on the opposite side of said conduit, third and fourth cavities each having therein photo cells having substantially flat light receiving end surfaces upon which there is deposited photo sensitive material, each photo cell being positioned in its cavity so that said light receiving surface is against the exterior planar surface of the light outlet window, said apparatus being further characterized in that said conduit is comprised of an opaque plate positioned between the light source and photo cell, said opaque plate having one planar side arranged normal to the axis of the light source and an opposite planar face arranged parallel to the flat end surfaces of the photo cells, the plate having an opening for carrying liquid past said windows, said transparent light inlet window being of a width less than the width of the liquid carrying aperture and said transparent light outlet window being wider than the width of the conduit so as to receive all the dispersed light passing through the liquid.

3. Apparatus for transilluminating fluid materials comprising a housing, opaque means mounted in the housing for retaining a fluid in position to be transilluminated, said opaque means having light inlet and light outlet windows disposed on opposite side of said opaque means and arranged on a common axis transversely of said means, said light inlet and light outlet windows being capable of transmitting light therethrough and permitting light being transmitted through the fluid in the opaque means, a light source mounted in the housing, a lens for focusing light on the inlet window, and photo electric means for measuring the intensity of light transmitted through the light outlet window, said apparatus being further characterized in that light outlet window is of a substantially larger area than the light inlet window, said outlet window having an opening therein in which the fluid is retained in contact with the inlet and outlet windows, and said photo-electric means includes an envelope and a flat end surface portion that is photo-sensitive, said photo-electric means being mounted in the housing to have the flat end surface portion within close proximity of the light outlet window.

References Cited in the file of this patent

UNITED STATES PATENTS

| | | |
|---|---|---|
| 2,193,215 | Evelyn | Mar. 12, 1940 |
| 2,411,092 | Hood et al. | Nov. 12, 1946 |
| 2,549,574 | Condiff | Apr. 17, 1951 |
| 2,630,735 | Rouy | Mar. 10, 1953 |
| 2,656,845 | Lindsay | Oct. 27, 1953 |
| 2,706,927 | Wood | Apr. 26, 1955 |
| 2,761,067 | Troy | Aug. 28, 1956 |

FOREIGN PATENTS

| | | |
|---|---|---|
| 594,497 | Great Britain | Nov. 12, 1947 |